(12) United States Patent
Ono

(10) Patent No.: US 8,254,369 B2
(45) Date of Patent: Aug. 28, 2012

(54) RADIO COMMUNICATION SYSTEM, BASE STATION, INTER-BASE STATION SYNCHRONIZATION METHOD, AND PROGRAM

(75) Inventor: Tomohiro Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 12/989,232

(22) PCT Filed: Apr. 20, 2009

(86) PCT No.: PCT/JP2009/057835
§ 371 (c)(1),
(2), (4) Date: Oct. 22, 2010

(87) PCT Pub. No.: WO2009/142084
PCT Pub. Date: Nov. 26, 2009

(65) Prior Publication Data
US 2011/0058503 A1    Mar. 10, 2011

(30) Foreign Application Priority Data
May 23, 2008   (JP) .................. 2008-135562

(51) Int. Cl.
*H04J 3/06*   (2006.01)
(52) U.S. Cl. .................. 370/350; 370/344; 370/328
(58) Field of Classification Search .......... 370/324, 370/344, 328, 350; 455/422.1
See application file for complete search history.

(56) References Cited

U.S. PATENT DOCUMENTS

| 7,983,143 B2 * | 7/2011 | Akita et al. .................. 370/208 |
| 2009/0073916 A1 * | 3/2009 | Zhang et al. .................. 370/315 |
| 2009/0233544 A1 * | 9/2009 | Oyman et al. .................. 455/7 |

FOREIGN PATENT DOCUMENTS

| JP | 6-334593 A | 12/1994 |
| JP | 10-163958 A | 6/1998 |
| JP | 2005318196 A | 11/2005 |

OTHER PUBLICATIONS

International Search Report for PCT/JP2009/057835 mailed Jul. 7, 2009.

* cited by examiner

*Primary Examiner* — Derrick Ferris
*Assistant Examiner* — Matthew Hopkins

(57) ABSTRACT

A radio communication system includes a terminal and base stations that transmit subframes to and receive subframes from said terminal by means of OFDMA/TDD. The base stations include a first base station and a second base station that is adjacent to the first base station and that establishes frame synchronization with the first base station. The second base station: receives a specific uplink signal contained in an uplink subframe that is transmitted to the first base station from the terminal that is located at the cell boundary of the first base station and the second base station; based on the timing of the reception of the specific uplink signal, estimates the timing of the transmission of the header of uplink subframes transmitted from the terminal; and based on the timing of the transmission of the header of the uplink subframes that was estimated, controls the timing of the transmission of downlink subframes that are transmitted to the terminal.

15 Claims, 5 Drawing Sheets

RADIO COMMUNICATION SYSTEM, BASE STATION, INTER-BASE STATION SYNCHRONIZATION METHOD, AND PROGRAM

The present application is the National Phase of PCT/JP2009/057835, filed Apr. 20, 2009, which claims priority based on Japanese Patent Application No. 2008-135562 for which application was submitted on May 23, 2008 and incorporates all of the disclosures of that application.

TECHNICAL FIELD

The present invention relates to a radio communication system, a base station, an inter-base station synchronization method, and a program.

BACKGROUND ART

In a WiMAX (Worldwide Interoperability for Microwave Access) radio communication system, the transmission and reception of data are carried out in subframe units.

In a WiMAX radio communication system, OFDMA (Orthogonal Frequency Division Multiple Access) is adopted for multiple access, and TDD (Time Division Duplex) is adopted for duplex.

OFDMA is a method of dividing the frequency direction by subcarriers and dividing the time direction by time slots and assigning subcarriers and time slots in which the subcarriers can be used to uplink and downlink data.

TDD is a method of using the same frequency in uplink and downlink and switching uplink subframes and downlink subframes on a time axis.

As a result, in a WiMAX radio communication system, frame synchronization must be established between base stations to synchronize the timing of the transmission of downlink subframes. In addition, a base stations must also establish time synchronization with UTC (Coordinated Universal Time) with an accuracy of 10 μsec (optionally, an accuracy of 1 μsec).

For this purpose, a base station normally incorporates a GPS (Global Positioning System) module and, by controlling the timing of the transmission of downlink subframes based on UTC time information received from a GPS satellite, and thereby base station realizes the time synchronization with UTC and inter-base station frame synchronization.

PRIOR ART

Patent Documents

Patent Document 1: JP-A-2005-318196

SUMMARY OF THE INVENTION

Problem to be Solved by the Invention

Incorporating GPS modules in all base stations that make up a radio communication system as described hereinabove enables the realization of time synchronization with UTC and inter-base station frame synchronization.

However, GPS modules are extremely expensive.

As a result, incorporating GPS modules uniformly in base stations that make up a radio communication system raises the problem of increased fabrication costs of the base stations.

It is therefore an object of the present invention to provide a radio communication system, a base station, an inter-base station synchronization method, and a program that solve the above-described problem.

Means for Solving the Problem

The radio communication system of the present invention includes a terminal and base stations that transmit and receive subframes by FDMA/TDD with the terminal, wherein the base stations include:
a first base station; and
a second base station that is adjacent to the first base station and that establishes frame synchronization with the first base station;
wherein the second base station:
receives a specific uplink signal contained in an uplink subframe transmitted to the first base station from the terminal that is located at the cell boundary of the first base station and the second base station and, based on the timing of the reception of the specific uplink signal, estimates the timing of the transmission of the header of uplink subframes transmitted from the terminal; and
based on the timing of the transmission of the header of the uplink subframe that was estimated, controls the timing of the transmission of downlink subframes that are transmitted to the terminal.

The base station of the present invention transmits and receives subframes by means of FDMA/TDD with a terminal and establishes frame synchronization with an adjacent base station, and includes:
an estimation unit that receives a specific uplink signal contained in an uplink subframe transmitted to an adjacent base station from a terminal located at the cell boundary of the base station and the adjacent base station and, based on the timing of the reception of the specific uplink signal, estimates the timing of the transmission of the header of uplink subframes transmitted from the terminal; and
a synchronization unit that controls the timing of the transmission of downlink subframes that are transmitted to the terminal based on the timing of the transmission of the header of the uplink subframe that was estimated.

The inter-base station synchronization method of the present invention is realized by a base station that transmits and receives subframes by means of FDMA/TDD with a terminal and that establishes frame synchronization with an adjacent base station and includes:
an estimation step of receiving a specific uplink signal contained in an uplink subframe transmitted to an adjacent base station from the terminal that is located at the cell boundary of the base station and the adjacent base station and, based on the timing of the reception of the specific uplink signal, estimating the timing of the transmission of the header of uplink subframes transmitted from the terminal; and
a synchronization step of controlling the timing of the transmission of downlink subframes that are transmitted to the terminal based on the timing of the transmission of the header of uplink subframes that was estimated.

The program of the present invention causes a base station that transmits and receives subframes by means of FDMA/TDD with a terminal and that establishes frame synchronization with an adjacent base station to execute:
an estimation procedure of receiving a specific uplink signal contained in an uplink subframe that is transmitted to an adjacent base station from a terminal located at the cell boundary of the base station and the adjacent base station and, based on the timing of the reception of the specific uplink signal, estimating the timing of the transmission of the header of uplink subframes transmitted from the terminal; and a synchronization procedure of controlling the timing of the transmission of downlink subframes that are transmitted to the terminal based on the timing of the transmission of the header of the uplink subframes that was estimated.

Effect of the Invention

According to the present invention, a second base station, based on the timing of the reception of a specific uplink signal contained in an uplink subframe that was transmitted to a first base station from a terminal located at the cell boundary with the first base station, estimates the timing of the transmission of the header of uplink subframes transmitted from the terminal, and based on the estimation result, controls the timing of the transmission of downlink subframes that are transmitted to the terminal.

In this way, the second base station is able to establish frame synchronization with the first base station and is thus able to collectively establish time synchronization with UTC if located adjacent to the first base station that incorporates a GPS module or that has established frame synchronization with a base station that incorporates a GPS module. The effect is therefore obtained in which the second base station need not incorporate a GPS module and can therefore be realized at lower fabrication cost.

BEST MODE FOR CARRYING OUT THE INVENTION

A best mode for carrying out the present invention is next described with reference to the accompanying figures.

In the exemplary embodiment described hereinbelow, a WiMAX radio communication system is described by way of example, but the present invention is not limited to WiMAX and can be generally applied to radio communication systems that adopt OFDMA/TDD.

Figure 1:
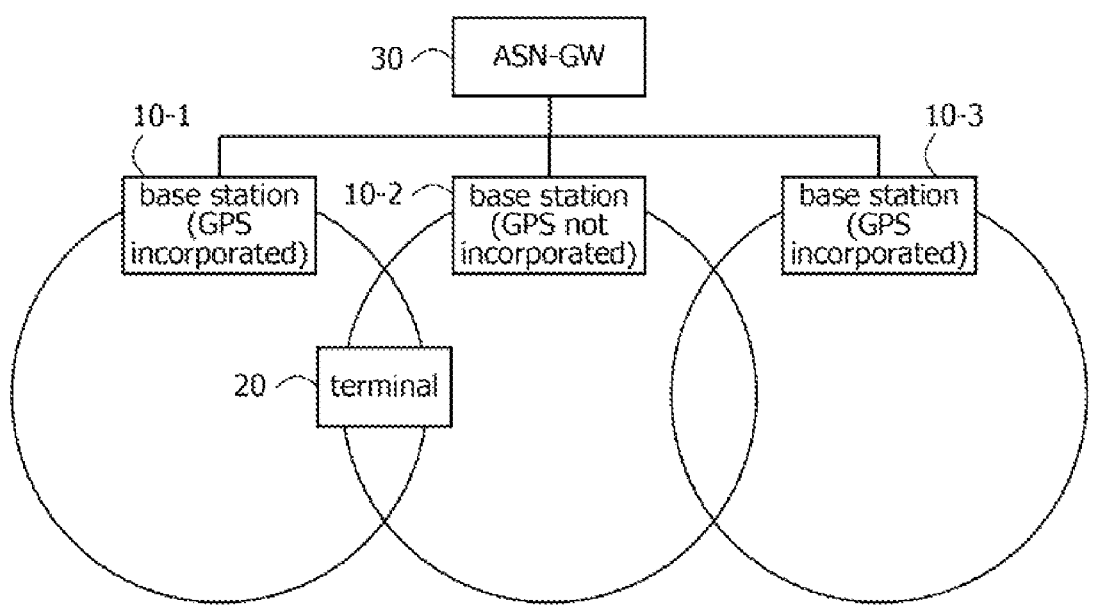
FIG. 1 shows the configuration of a radio communication system of an exemplary embodiment of the present invention.

Referring to FIG. 1, the radio communication system of the present exemplary embodiment includes base stations 10-1 and 10-3 that are the first base stations, base station 10-2 that is the second base station, terminal (mobile station) 20, and ASN-GW (Access Service Network-Gateway) 30.

In FIG. 1, base station 10-2 is arranged adjacent to each of base stations 10-1 and 10-3. In addition, only one terminal 20 located at the cell boundary of base stations 10-1 and 10-2 is shown, and other terminals located at the cell boundary of base stations 10-1 and 10-2 or terminals located at the cell boundary of base stations 10-2 and 10-3 are omitted. Although the number of base stations 10 is three, the present invention is not limited to this number. In addition, base station 10-1-10-3 and ASN-GW 30 are connected by way of a network and are able to communicate with one another.

Base stations 10-1 and 10-3 incorporate GPS modules and, by controlling the timing of the transmission of downlink subframes based on UTC time information received from a GPS satellite, realize time synchronization with UTC and frame synchronization with other base stations.

In contrast, base station 10-2 does not incorporate a GPS module. As a result, base station 10-2 collectively establishes time synchronization with UTC by establishing frame synchronization with base station 10-1 or with base station 10-3 that incorporates a GPS module.

Figure 2:
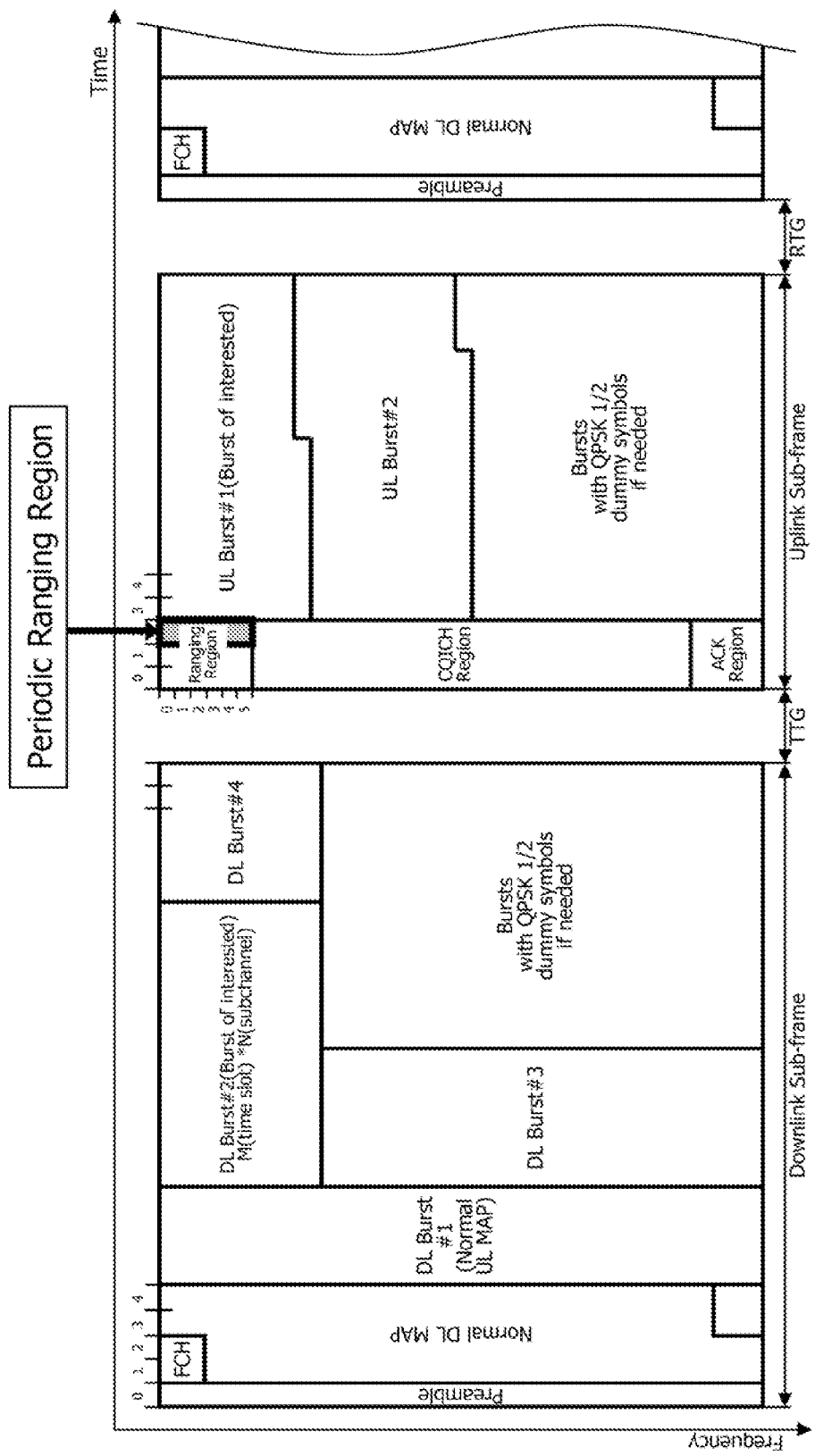
FIG. 2 is view for explaining the frame structure used in the radio communication system shown in FIG. 1.

At this time, base station 10-2 uses a frame structure such as shown in FIG. 2 that is used in the radio communication system of the present exemplary embodiment to establish frame synchronization with base station 10-1 or 10-3. The frame structure shown in FIG. 2 is prescribed in WiMAX.

Referring to FIG. 2, the frame structure of the present exemplary embodiment is a structure in which uplink subframes and downlink subframes are switched on the time axis (TDD). In addition, gap times referred to as TTG (Transmit/Receive Transition Gaps) and RTG (Receive/Transmit Transition Gaps) are present between uplink subframes and downlink subframes.

In downlink subframes and uplink subframes, signals or data are loaded in each of the regions that are partitioned by subcarriers in the frequency direction and time slots in the time direction (OFDMA).

In a downlink subframe, a Preamble region, in which a Preamble signal that is a Pilot signal is loaded, is arranged in the header, following which a DL-MAP region carrying signals that indicate, for example, the positions of downlink data (DL Bursts) and an UL-MAP region that carries signals indicating, for example, the positions of uplink data (UL Bursts) are arranged in order. Downlink data are loaded in subsequent regions.

In an uplink subframe, on the other hand, a Ranging region is arranged in the header, this region carrying a Ranging signal for executing Ranging in which timing, frequency, and power are adjusted on the terminal side. Uplink data are loaded into subsequent regions.

In the ranging region, a periodic ranging region is included that carries a periodic ranging signal that a terminal periodically transmits to the base station to which it is radio-connected for executing ranging. The periodic ranging signal is a signal that indicates, for example, reception CINR (Carrier to Interference plus Noise Ratio) that is measured at the terminal.

Accordingly, when base station 10-2 receives the periodic ranging signal that is transmitted from terminal 20 to base station 10-1 when terminal 20 and base station 10-1 are in a radio-connected state, base station 10-2 is able to estimate the timing of the transmission of the header of uplink subframes transmitted from terminal 20 based on the timing of the reception.

As a result, base station 10-2 is able to establish frame synchronization with base station 10-1 by using the above-described estimation result to control the timing of the transmission of downlink subframes that are transmitted to terminal 20.

In this case, terminal 20 receives downlink subframes from both of base stations 10-1 and 10-2 and therefore reports to base station 10-2 the timing differential of the timing of the receptions of the Preamble signals contained in the respective downlink subframes.

Based on the timing differential reported from terminal 20, base station 10-2 is able to implement fine adjustment of the timing of the transmission of downlink subframes transmitted to terminal 20 to achieve even greater precision of frame synchronization with base station 10-1.

The internal configuration of base stations 10-1-10-3 and terminal 20 that realize the above-described operations is next described.

Figure 3:
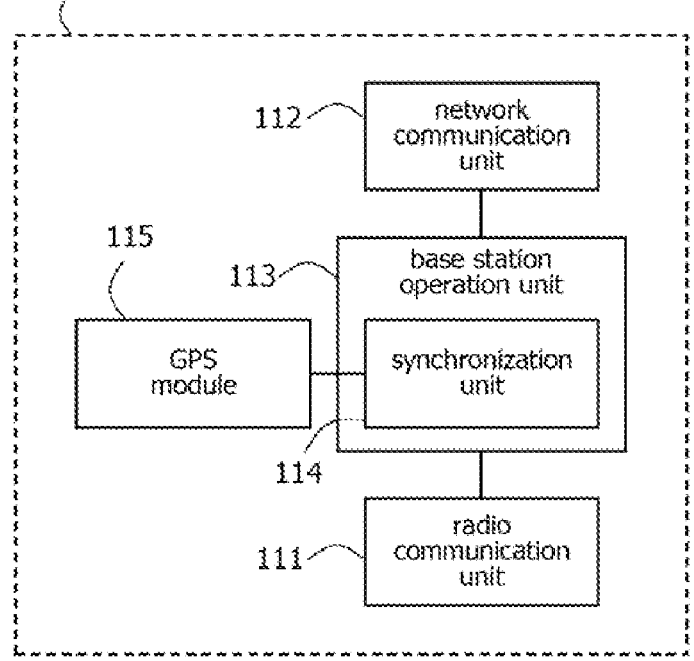
FIG. 3 is a block diagram showing the configuration of a base station that incorporates a GPS module of the base stations shown in FIG. 1.

Base stations 10-1 and 10-3 that incorporate GPS modules are first described. Referring to FIG. 3, the internal configuration of base station 10-1 is next described, and this configuration is identical to the configuration of base station 10-3.

Referring to FIG. 3, base station 10-1 includes radio communication unit 111, network communication unit 112, base station operation unit 113, and GPS module 115.

Radio communication unit 111 carries out radio communication with terminal 20.

Network communication unit 112 carries out network communication with other base stations 10-2 and 10-3 and ASN-GW 30.

GPS module 115 receives UTC time information from a GPS satellite.

Base station operation unit 113 includes synchronization unit 114.

Synchronization unit 114 controls the timing of the transmission of downlink subframes that are transmitted to terminal 20 based on the UTC time information received from a GPS satellite in GPS module 115.

Although base station operation unit 113 has further constituent elements for realizing the same functions as a base station that is generally used in a WiMAX radio communication system, these constituent elements are known, and explanation of these components is therefore here omitted.

The internal configuration of base station 10-2 that lacks a GPS module is next described with reference to FIG. 4.

Figure 4:
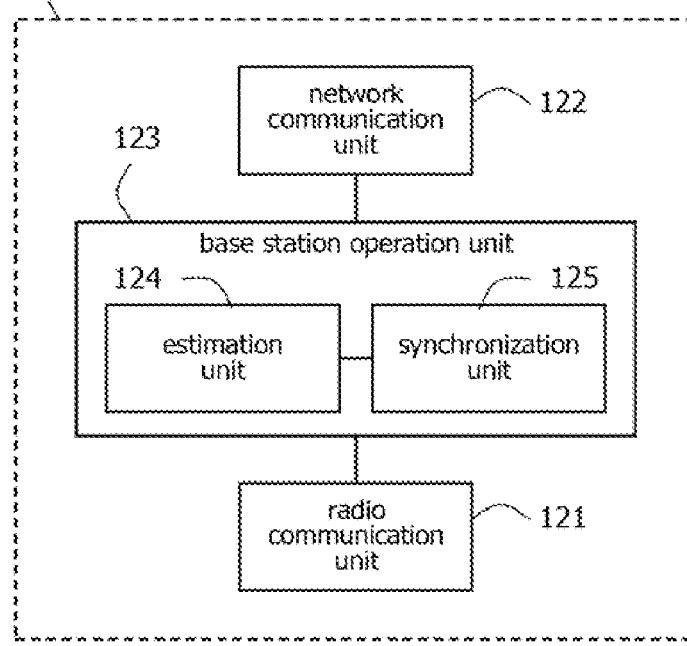
FIG. 4 is a block diagram showing the configuration of a base station that does not incorporate a GPS module among the base stations shown in FIG. 1.

Referring to FIG. 4, base station 10-2 includes radio communication unit 121, network communication unit 122, and base station operation unit 123.

Radio communication unit 121 carries out radio communication with terminal 20.

Network communication unit 122 carries out network communication with other base stations 10-1 and 10-3 and ASN-GW 30.

Base station operation unit 123 includes estimation unit 124 and synchronization unit 125.

Estimation unit 124, for example, receives the Periodic Ranging signal contained in an uplink subframe that is transmitted from terminal 20 to base station 10-1 when terminal 20 and base station 10-1 are in a radio-connected state, and based on the timing of the reception of the Periodic Ranging signal, estimates the timing of the transmission of the header of uplink subframes transmitted from terminal 20.

Synchronization unit 125 controls the timing of the transmission of downlink subframes that are transmitted to terminal 20 based on the timing of the transmission of the header of the uplink subframes that was estimated in estimation unit 124.

Synchronization unit 125 further, upon being notified from terminal 20 of the timing differential of the timing of the receptions of the Preamble signals of base stations 10-1 and 10-2, implements fine adjustment of the timing of the transmission of downlink subframes that are transmitted to terminal 20 based on the timing differential.

Although base station operation unit 123 includes further constituent elements for realizing the same functions as base stations generally used in a WiMAX radio communication system, these constituent elements are well known and further explanation is therefore here omitted.

The internal configuration of terminal 20 is next described with reference to FIG. 5.

Figure 5:
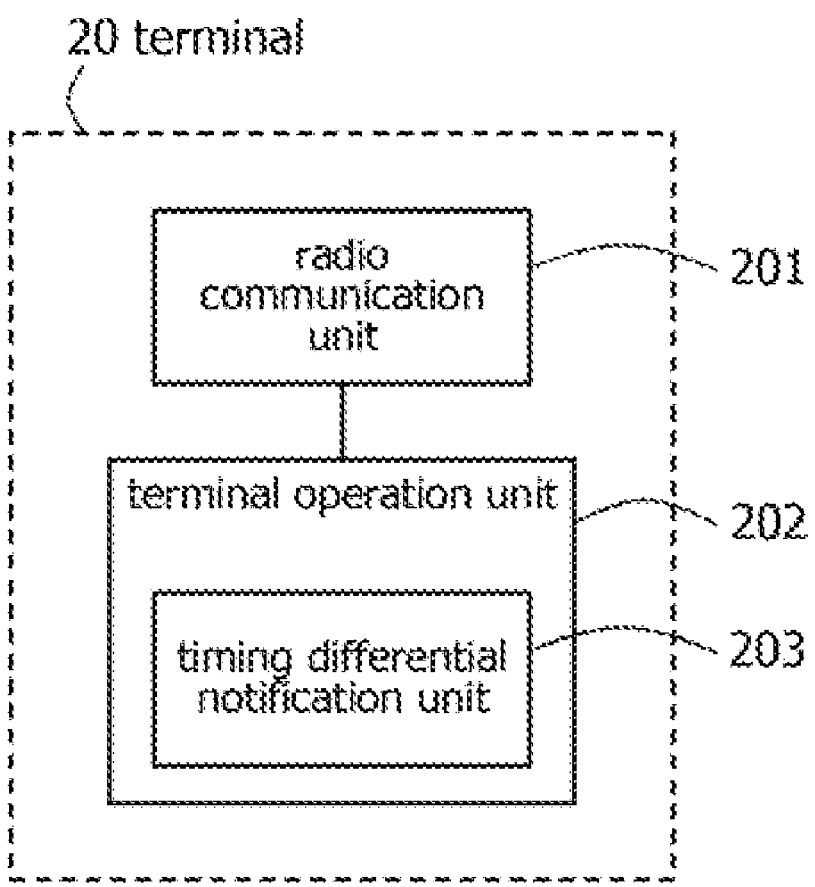
FIG. 5 is a block diagram showing the configuration of the terminal shown in FIG. 1.

Referring to FIG. 5, terminal 20 includes radio communication unit 201 and terminal operation unit 202.

Radio communication unit 201 carries out radio communication between base stations 10-1 and 10-2.

Terminal operation unit 202 includes timing differential notification unit 203.

Timing differential notification unit 203, upon receiving downlink subframes from base station 10-2 when, for example, terminal 20 and base station 10-1 are in a radio-connected state, reports to base station 10-2 the timing differential of the timing of the receptions of the Preamble signals contained in downlink subframes received from each of base stations 10-1 and 10-2.

Although terminal operation unit 202 further includes constituent elements for realizing the same functions of terminals generally used in a WiMAX radio communication system, these constituent elements are well known and explanation of these elements is therefore here omitted.

The operations of the radio communication system of the present exemplary embodiment are next described with reference to FIG. 6.

In the interest of simplifying the explanation, it is here assumed that only terminal 20 is located at the cell boundary of base stations 10-1 and 10-2 and that terminals are not located at the cell boundary of base stations 10-2 and 10-3. It is further assumed that terminal 20 and base station 10-1 are radio-connected and are in a state of transmitting and receiving subframes.

Figure 6:
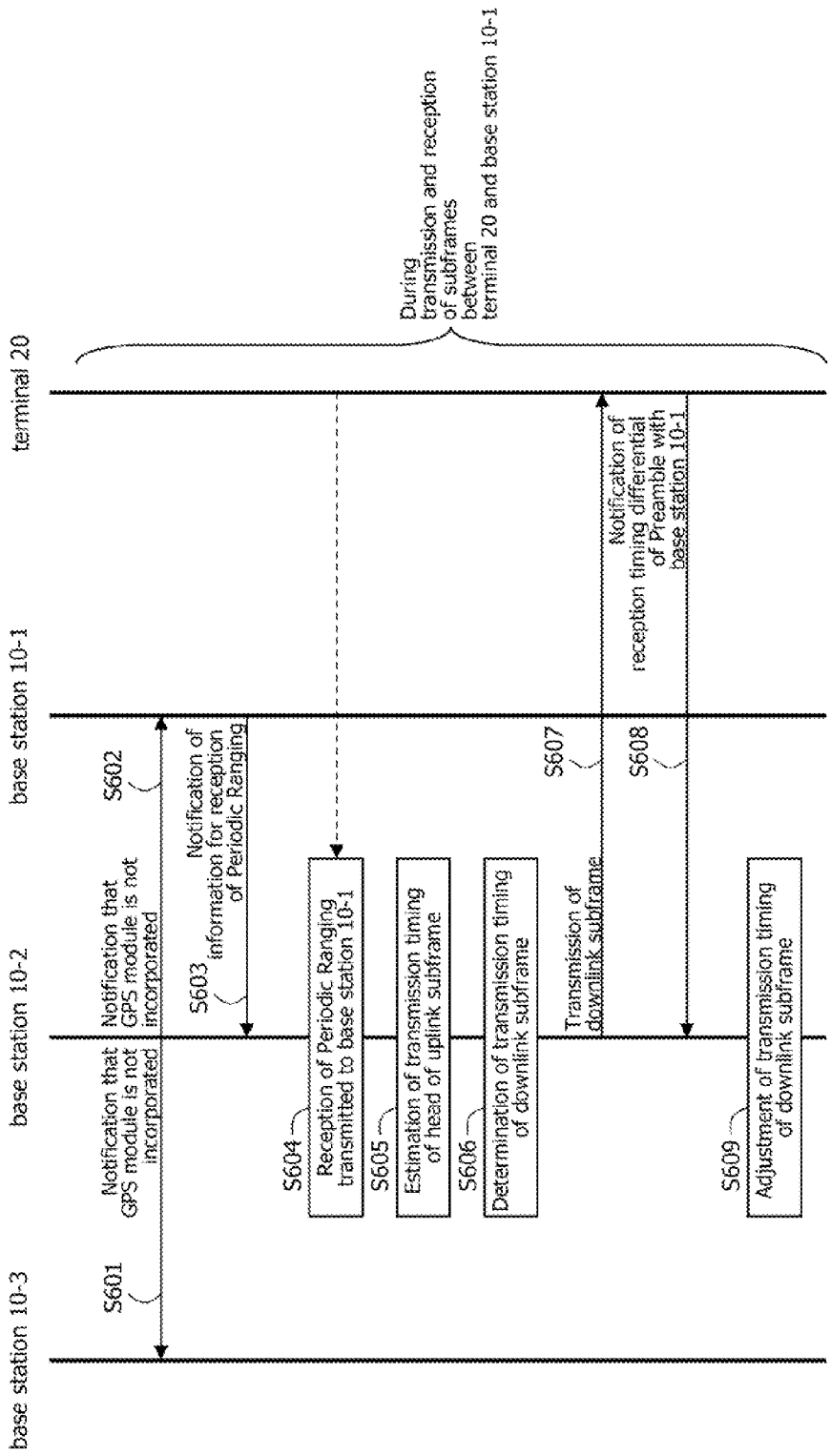
FIG. 6 is a flow chart for explaining the operations of the radio communication system shown in FIG. 1.

Referring to FIG. 6, during initialization, synchronization unit 125 of base station 10-2 reports to adjacent base stations 10-1 and 10-3 and ASN-GW 30 in Steps S601 and S602 that its own station does not incorporate a GPS module.

In Step S603, synchronization unit 114 of base station 10-1 reports to base station 10-2 either directly or by way of ASN-GW 30 information for receiving a Periodic Ranging signal contained in uplink subframes transmitted from terminal 20. The information that is here reported is, for example, the BSID of base station 10-1, the MSID of terminal 20, frequency, bandwidth mode, and the DL/UL ratio (including TTG/RTG).

Because it is assumed that a terminal is not located at the cell boundary of base stations 10-2 and 10-3 in FIG. 6, a report from base station 10-3 can be omitted in Step S603.

After initialization, base station 10-2 proceeds to a continuous reception mode of carrying out only reception of subframes without carrying out transmission. A base station that incorporates a GPS module normally proceeds to an operation mode of transmitting and receiving subframes after initialization.

In Step S604, estimation unit 124 of base station 10-2 next, based on the information reported from base station 10-1 in Step S603, receives a Periodic Ranging signal contained in an uplink subframe transmitted to base station 10-1 from terminal 20, and in Step S605, based on the timing of the reception of the Periodic Ranging signal, estimates the timing of the transmission of the header of uplink subframes transmitted from terminal 20.

In FIG. 6, the existence of only one terminal 20 is assumed, but when a plurality of terminals are located at the cell boundary of base stations 10-1 and 10-2 and the cell boundary of base stations 10-2 and 10-3, base station 10-2 receives Periodic Ranging signals from each of this plurality of terminals. In this case, base station 10-2 averages the timing of the receptions of the plurality of Periodic Ranging signals and, based on this reception timing, estimates the timing of the transmission of the header of uplink subframes that are transmitted from terminal 20.

In Step S606, synchronization unit 125 of base station 10-2 next controls the timing of the transmission of downlink subframes that are transmitted to terminal 20 based on the timing of the transmission of the header of uplink subframes that was estimated in estimation unit 124.

At this time, base station 10-2 proceeds to the operation mode, and in Step S607, downlink subframes are transmitted from radio communication unit 121 to terminal 20 at the timing of the transmission that is controlled in synchronization unit 125.

In this way, base station 10-2 is able to establish frame synchronization with base station 10-1 and can collectively establish time synchronization with UTC.

Next, in Step S608, upon receiving a downlink subframe from base station 10-2, timing differential notification unit 203 of terminal 20 measures the timing differential of reception timings of the Preamble signals contained in downlink subframes received from each of base stations 10-1 and 10-2, and reports the timing differential that was measured to base station 10-2. At this time, timing differential notification unit 203 carries out notification by loading a signal that indicates the measured timing differential in, for example, a CQICH (Channel Quality Indicator Channel) region of the header of uplink subframes.

In Step S609, synchronization unit 125 of base station 10-2 then, based on the timing differential that was reported from terminal 20, implements fine adjustment of the timing of the transmission of downlink subframes that are transmitted to terminal 20.

Base station 10-2 is thus able to achieve even greater precision of frame synchronization with base station 10-1.

In the present exemplary embodiment as described hereinabove, base station 10-2 estimates the timing of the transmission of the header of uplink subframes transmitted from terminal 20 based on the timing of the reception of a Periodic Ranging signal that is contained in uplink subframes transmitted to base station 10-1 from terminal 20 that is located at the cell boundary of base stations 10-1 and 10-2, and based on the estimation result, controls the timing of the transmission of downlink subframes that are transmitted to terminal 20.

Accordingly, base station 10-2 is able to establish frame synchronization with base station 10-1 that incorporates a GPS module and can collectively establish time synchronization with UTC, whereby the effect is obtained in which the need to incorporate a GPS module can be eliminated and fabrication costs can be reduced. In addition, because base station 10-2 does not need to incorporate a GPS module, the effect is further obtained in which a greater advantage can be achieved through miniaturization.

In the present exemplary embodiment, terminal 20 reports to base station 10-2 the timing differential of the reception timings of Preamble signals contained in downlink subframes received from each of base stations 10-1 and 10-2, and base station 10-2 implements fine adjustment of the timing of the transmission of downlink subframes based on the timing differential that was reported from terminal 20.

Accordingly, base station 10-2 is able to achieve frame synchronization with base station 10-1 with even greater precision.

Although explanation related to operations for a case in which base station 10-2 uses a Periodic Ranging signal contained in uplink subframes in the control of the timing of the transmission of downlink subframes in the present exemplary embodiment, the signal used in the control of the timing of the transmission of downlink subframes is not limited to a Periodic Ranging signal and may be a Ranging signal contained in uplink subframes.

In the present exemplary embodiment, moreover, operation was described for a case in which base station 10-2 establishes frame synchronization with base station 10-1 that incorporates a GPS module as a reference, but the present invention is not limited to this form.

In other words, base station 10-2 does not incorporate a GPS module but is able to effectively achieve time synchronization with UTC by means of the above-described frame synchronization operation. As a result, a base station that does not incorporate a GPS module but that is adjacent to base station 10-2 is able to establish time synchronization with UTC by establishing frame synchronization with base station 10-2 as a reference.

Accordingly, the effect is obtained in which a multi-hop configured radio communication system can be constructed at low cost through the execution of the above-described frame synchronization operation by a base station that does not incorporate a GPS module with, as reference, a base station that incorporates a GPS module or a base station that is in frame synchronization with a base station that incorporates a GPS module.

In addition, because base station 10-2 does not need to incorporate a GPS module in the present exemplary embodiment, base station 10-2 can be installed in locations in which a GPS satellite cannot be picked up or in which a GPS satellite is difficult to pick up, whereby the effect is further obtained in which the area covered by a radio communication system can be extended.

Because the area covered by a radio communication system is extended, another effect that is obtained is the advantage of providing a high-speed radio service that employs multiple modulation in downlinks by means of the transmitter diversity effect during operation of a MBS (Multicast Broadcast Service).

The method carried out by base stations 10-1-10-3 and terminal 20 of the present invention may also be applied to a program that is executed by a computer. This program can be stored on a memory medium and can be provided to the outside by way of a network.

Although the present invention has been described with reference to an exemplary embodiment, the present invention is not limited to the above-described exemplary embodiment. The constitution and details of the present invention are open to various modifications within the scope of the present invention that will be clear to any one of ordinary skill in the art.

What is claimed is:

1. A radio communication system that includes a terminal and a base station that transmits and receives subframes by OFDMA/TDD with said terminal, wherein said radio communication system comprises:
    a first base station; and
    a second base station that is adjacent to said first base station and that establishes frame synchronization with said first base station;
    wherein said second base station:
    receives a specific uplink signal contained in uplink subframes transmitted to said first base station from a terminal located at a cell boundary of said first base station and said second base station and, based on the timing of the reception of said specific uplink signal, estimates the timing of the transmission of the header of uplink subframes transmitted from said terminal; and based on said transmission timing of the header of uplink subframes that was estimated, controls the timing of the transmission of downlink subframes transmitted to said terminal;

wherein said second base station, when said specific uplink signals are received from a plurality of terminals located at the cell boundary of said first base station and said second base station, estimates the timing of the transmission of the header of uplink subframes that are transmitted from said plurality of terminals based on a reception timing obtained by averaging the timing of the receptions of said specific uplink signals.

2. The radio communication system as set forth in claim 1, wherein said specific uplink signal is a signal of a Ranging region contained in uplink subframes.

3. The radio communication system as set forth in claim 1, wherein said specific uplink signal is a signal of a Periodic Ranging region that is contained in uplink subframes.

4. A radio communication system as set forth in claim 1, wherein:

said terminal reports to said second base station a timing differential of the timing of the receptions of specific downlink signals contained in downlink subframes received from each of said first and second base stations; and said second base station, based on said timing differential that was reported from said terminal, implements fine adjustment of the timing of the transmission of said downlink subframes that is controlled.

5. The radio communication system as set forth in claim 4, wherein said specific downlink signal is a signal of the Preamble region contained in downlink subframes.

6. A base station that transmits and receives subframes by means of OFDMA/TDD with a terminal and that establishes frame synchronization with an adjacent base station, comprising:

an estimation unit that receives a specific uplink signal contained in an uplink subframe transmitted to an adjacent base station from a terminal located at the cell boundary between said base station and the adjacent base station and, based on the timing of the reception of said specific uplink signal, estimates the timing of the transmission of the header of an uplink subframes transmitted from said terminal; and a synchronization unit that controls the timing of the transmission of downlink subframes that are transmitted to said terminal based on said transmission timing of the header of uplink subframes that was estimated;

wherein said estimation unit, upon receiving said specific uplink signals from a plurality of terminals located at the cell boundary of said base station and an adjacent base station, estimates the timing of the transmission of the header of uplink subframes that are transmitted from said plurality of terminals based on a reception timing obtained by averaging the timing of the receptions of said specific uplink signals.

7. The base station as set forth in claim 6, wherein said specific uplink signal is a signal of a Ranging region contained in uplink subframes.

8. The base station as set forth in claim 6, wherein said specific uplink signal is a signal of a Periodic Ranging region contained in uplink subframes.

9. The base station as set forth in claim 6, wherein said synchronization unit, upon being notified from said terminal of a timing differential of reception timings of specific downlink signals contained in downlink subframes received in said terminal from each of said base station and an adjacent base station, implements fine adjustment of said transmission timing of downlink subframes that is controlled based on the timing differential.

10. The base station as set forth in claim 9, wherein said specific downlink signal is a signal of the Preamble region contained in downlink subframes.

11. An inter-base station synchronization method realized by a base station that transmits and receives subframes by means of OFDMA/TDD with a terminal and that establishes frame synchronization with an adjacent base station, comprising:

an estimation step of receiving a specific uplink signal contained in an uplink subframe transmitted to an adjacent base station from a terminal located at the cell boundary of said base station and an adjacent base station and, based on the timing of the reception of said specific uplink signal, estimating the timing of the transmission of the header of uplink subframes transmitted from said terminal; and a synchronization step of controlling the timing of the transmission of downlink subframes that are transmitted to said terminal based on said transmission timing of the header of uplink subframes that was estimated;

wherein, in said estimation step, when said specific uplink signals are received from a plurality of terminals located at the cell boundary of said base station and an adjacent base station, the timing of the transmissions of the header of uplink subframes that are transmitted from said plurality of terminals are estimated based on a reception timing obtained by averaging the timing of the receptions of said specific uplink signals.

12. The inter-base station synchronization method as set forth in claim 11, wherein said specific uplink signal is a signal of a Ranging region contained in uplink subframes.

13. The inter-base station synchronization method as set forth in claim 11, wherein said specific uplink signal is a signal of a Periodic Ranging region contained in uplink subframes.

14. The inter-base station synchronization method as set forth in claim 11, wherein, in said synchronization step, upon notification from said terminal of a timing differential of reception timings of specific downlink signals contained in downlink subframes received by said terminal from each of said base station and an adjacent base station, said transmission timing of downlink subframes that is controlled is subjected to fine adjustment based on the timing differential.

15. The inter-base station synchronization method as set forth in claim 14, wherein said specific downlink signal is a signal of a Preamble region contained in downlink subframes.

* * * * *